United States Patent

Nishikubo et al.

[11] Patent Number: 6,124,402
[45] Date of Patent: Sep. 26, 2000

[54] POLYADDITION COPOLYMER AND PROCESS FOR PRODUCING THE SAME

[75] Inventors: Tadatomi Nishikubo, Fujisawa; Atsushi Kameyama, Yokohama, both of Japan

[73] Assignee: Kanagawa University, Yokohama, Japan

[21] Appl. No.: 09/267,102

[22] Filed: Mar. 12, 1999

[30] Foreign Application Priority Data

Mar. 27, 1998 [JP] Japan .................................. 10-100195

[51] Int. Cl.$^7$ ............................... C08F 8/00; C08L 63/10
[52] U.S. Cl. ......................... 525/109; 525/108; 525/132; 528/154; 528/104; 528/87; 528/425; 528/486; 528/487
[58] Field of Search ...................... 525/109, 108, 525/132; 528/154, 104, 87, 425, 486, 487

[56] References Cited

U.S. PATENT DOCUMENTS 4,104,433  8/1978  Kirk et al. .............................. 428/245

OTHER PUBLICATIONS

Chem Abstract, 123:171446 "Active energy ray curable compositions for cared products with good adhesion to base materials" Yutaka et al.

Reactive & Functional Polymers 37 (1998) 19–25 Elsevier Science, B.V., T. Nishikubs et al.

Polymer Preprints, Japan vol. 46, No. 2 (1997), p. 298.

*Primary Examiner*—Duc Truong
*Attorney, Agent, or Firm*—Baker & Daniels

[57] ABSTRACT

A novel polyaddition copolymer having repetition units represented by the following general formula:

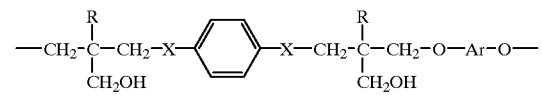

where R: a lower alkyl group, Ar: a bisphenol compound residue, and X: a $CH_2O$ group or a COO group, is obtained by copolymerization reaction of a bisoxetane compound represented by the following general formula:

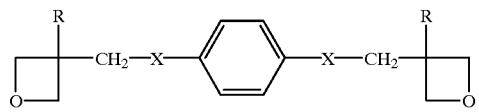

and a bisphenol compound.

8 Claims, No Drawings

POLYADDITION COPOLYMER AND PROCESS FOR PRODUCING THE SAME

BACKGROUND OF THE INVENTION

1. Field of the Invention

The present invention relates to a polyaddition copolymer and a process for producing the same, and more particularly to a polyaddition copolymer having reactive hydroxyl groups on side chains and a process for producing the same.

2. Description of the Invention

It is known that cyclic ether compounds of 3-membered or 4-membered ring have an unbalanced electric charge distribution owing to ring distortion energy or strong electron attractiveness of endocyclic oxygen atom and thus show a high reactivity. Above all, epoxy compounds of three-membered ring ether structure easily react with various nucleophilic reagents or electrophilic reagents and thus are widely used in organic synthetic reactions. Polyaddition reactions such as polyaddition reaction of a diepoxy compound and dicarboxylic acid dichloride, etc. are also known.

On the other hand, it is known that oxetane compounds, i.e. cyclic ether compounds of 4-membered ring, can easily undergo ring-opening polymerization by Lewis acids, etc. as an initiator to give polyethers of high molecular weight, but addition reaction using oxetane compounds have not been reported so far, except for production of soluble polymers by polyaddition reaction of a bisoxetane compound and a dithiol, as reported by the present inventors [Polymer Preprints, Japan, 46, 298(1997)].

SUMMARY OF THE INVENTION

An object of the present invention is to provide a novel polyaddition copolymer having reactive hydroxyl groups on side chains and a process for producing the same.

By the present invention, it is provided a novel polyaddition copolymer having repetition units represented by the following general formula:

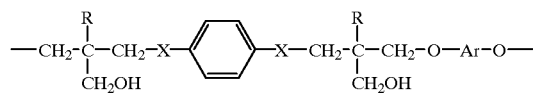

where R is a lower alkyl group, Ar is a bisphenol compound residue and X is a $CH_2O$ group or a $COO$ group.

The present novel polyaddition copolymer can be produced by copolymerization reaction of a bisoxetane compound represented by the following general formula:

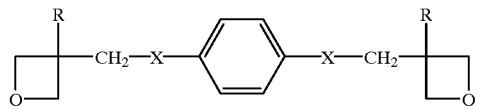

and a bisphenol compound HO—Ar—OH, where R, Ar and X have the same meanings as defined above.

DETAILED DESCRIPTION OF THE INVENTION

The bisoxetane compound represented by the foregoing general formula can be prepared by reacting one part by mole of a 3-lower alkyl-3-methyloloxetane with two parts by mole of p-xylylene dihalide or terephthalic acid dihalide. The reaction can be carried out in the presence of a quaternary onium salt, a tertiary amine, or the like as a catalyst. In case of p-xylylene dihalide, NaOH, KOH or the like can be used together.

Bisphenol compound for use in an equimolar amount to the bisoxetane compound includes, for example, bisphenol A or its 3,3',5,5'-tetrachioro-substituted compound, bisphenol F, bisphenol AF, bisphenolsulfone or its 3,3',5,5'-tetrabromo-substituted compound, hydrogenated bisphenol A, bisphenol, etc.

Polyaddition reaction can be carried out without any catalyst, but preferably in the presence of such a catalyst as a quaternary onium salt, Crown ether complex, an organic sulfonic acid, etc., where an increase in yield or number average molecular weight is observable.

Quaternary onium salt as a catalyst can be represented by the following general formula, and quaternary phosphonium salts can be preferably used:

or

where $R_1$ to $R_4$ are each an alkyl group having 1 to 25 carbon atoms, an alkoxy group, an aryl group, an alkylaryl group, an aralkyl group or a polyoxyalkylene group, or two or three of which may form a heterocyclic structure together with N or P; and $X^-$ is an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO^{--}$, etc.

Specifically, it includes quaternary ammonium salts such as tetrabutylammonium bromide, tetrabutylammonium chloride, tetrabutylammonium iodide, tetraethylammonium bromide, tetraethylammonium chloride, tetraethylammonium iodide, n-dodecyltrimethylammonium bromide, octadecyltrimethylammonium bromide, trimethylbenzylammonium bromide, cetyldimethylbenzylammonium chloride, cetylpyridinium bromide, cetylpyridinium sulfate, tetraethylammonium acetate, trimethylbenzylammonium benzoate, trimethylbenzylammonium borate, 5-benzyl-1,5-diazabicyclo[4,3,0]-5-nonenium chloride, 5-benzyl-1,5-diazabicyclo[4,3,0]-5-nonenium tetrafluoroborate, etc.; quaternary phosphonium salts such as tetraphenylphosphonium chloride, benzyltriphenylphosphonium bromide, benzyltriphenylphosphonium chloride, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium chloride, trioctylethylphosphonium acetate, tetraoctylphosphonium chloride, trioctylethylphosphonium dimethylphosphate, etc.

Reaction of the bisoxetane compound and the bisphenol compound can be also carried out in the presence of Crown ether complex as a catalyst. Crown ether for this purpose includes, for example, 12-Crown-4, 15-Crown-5, 18-Crown-6, dibenzo-18-Crown-6, 21-Crown-7, 24-Crown-8, etc., which are used as complexes with in organic or organic salts such as KF, KCl, KBr, CsF, CsCl, CsBr, potassium thiocyanate, sodium phenoxide, potassium phenoxide, sodium benzoate, potassium benzoate, sodium acetate, potassium acetate, etc. Organic sulfonic acid as a catalyst includes, for example, p-toluenesulfonic acid, trifluoromethanesulfonic acid, etc.

These quaternary onium salt, Crown ether complex, organic sulfonic acid, etc. as a catalyst can be used in an amount of about 1 to about 20% by mole, preferably about 2 to about 10% by mole on the basis of the bisoxetane compound. Below about 1% by mole, polyaddition reaction hardly proceeds, whereas above about 20% by mole, no more remarkable effect can be obtained.

The polyaddition reaction with or without the catalyst can be carried out even without any organic solvent, but such an organic solvent as an aromatic hydrocarbon (e.g. benzene, toluene, xylene, etc.), a halogenated aromatic hydrocarobn (e.g. chlorobenzene, o-dichlorobenzene, etc.), an alkoxyaromatic hydrocarbon (e.g. anisole, etc.), an aprotonic polar solvent (e.g. dimethyl formamide, dimethyl acetamide, N-methyl-2-pyrrolidone, dimethyl sulfoxide, etc.), etc. can be used in a ratio of about 0.5 to about 20 v./w., preferably about 2 to about 10 v./w. to the monomer mixture.

Polyaddition reaction can be carried out at a temperature of about 100° to about 200° C., preferably about 120° to about 160° C. for about 1 to about 120 hours, preferably for about 10 to about 100 hours, whereby a polyaddition copolymer having a number average molecular weight Mn of about 2,000 to about 50,000, preferably about 5,000 to about 20,000 can be formed.

Polyaddition reaction of a bisepoxy compound and a bifunctional compound having active hydrogen atoms seems very hardly to produce soluble polymers, because the polyaddition reaction proceeds between the hydroxyl groups on the resulting side chains and the epoxy groups, but in case of using an oxetane compound of 4-membered ring, no such a reaction proceeds between the hydroxyl groups on the resulting side chains and the oxetane ring, soluble polymers seem to be easily obtained. Furthermore, the resulting soluble polymers have reactive primary hydroxyl groups on the side chains and thus can be effectively used as reactive polymers.

PREFERRED EMBODIMENTS OF THE INVENTION

The present invention will be described in detail below, referring to Reference Examples and Examples.

REFERENCE EXAMPLE 1

A solution containing 14.17 g (0.053 moles) of p-xylene dibromide dissolved in 320 ml of toluene, 10.96 g (0.107 moles) of 3-methyl-3-methyloloxetane and 4.99 g (0.015 moles) of tetrabutylammonium bromide and an aqueous 50 wt. % sodium hydroxide solution (NaOH85 g/$H_2O$ 85 ml) were charged into a three-necked flask having a capacity of 1 L and vigorously stirred at 50° C. for 2 hours with a three-one motor.

After the reaction, the reaction product was separated into a toluene layer and an aqueous layer, and the toluene layer was washed with distilled water, dried over anhydrous magnesium sulfate overnight, distilled off toluene and subjected to preparative chromatography, whereby 3.56 g (yield: 22%) of 1,4-bis[3-(3-methyloxetanyl) methoxymethyl]benzene [BMOB] having the following formula was obtained as a colorless, transparent liquid:

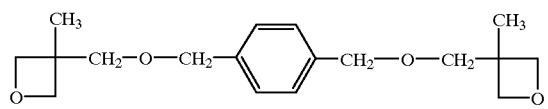

Infrared absorption spectrum: 1253 $cm^{-1}$ (C—O—C ether) 985 $cm^{-1}$ (C—O—C cyclic ether)

$^1$H-NMR(200 MHz, TMS, $CDCl_3$) δ(ppm): 1.34(s, 6.0H, —$CH_3$), 3.53(s, 4.0H, C—$CH_2$—OCO), 4.45(d, 2.1H, J=5.9 Hz, —$CH_2$—O—, oxetane), 4.65(d, 2.0H, J=5.9 Hz, —$CH_2$—O—, oxetane), 8.14 (s, 4.0H, aromatic H).

REFERENCE EXAMPLE 2

31.95 g (0.350 mole) of 3-ethyl-3-methyloloxetane was charged into a three-necked flask having a capacity of 500 ml, and then 100 ml of tetrahydrofuran was added thereto to dissolve the 3-ethyl-3-methyloloxetane. Then, 35.57 g (0.175 moles) of terephthalic acid dichloride diluted with 100 ml of tetrahydrofuran was dropwised added to the solution over about 20 minutes with ice cooling, and further 53.13 g (0.525 moles) of triethylamine diluted with 100 ml of tetrahydrofuran was dropwise added thereto over about 20 minutes with ice cooling. The resulting mixture was stirred for about 3 hours with ice cooling.

After the reaction, the reaction mixture was poured into 500 ml of distilled water to precipitate the reaction product. The precipitates were recovered therefrom by filtration, recrystallized from a solvent mixture of n-hexane-methyl ethyl ketone in a ratio by volume of 1:1, and dried at 60° C. under reduced pressure for 10 hours, whereby 23.41 g (yield: 40%) of bis[3-(3-ethyloxetanyl)methyl]terephthalate having the following formula was obtained as white crystals having a melting point of 126.0°~127.0° C.:

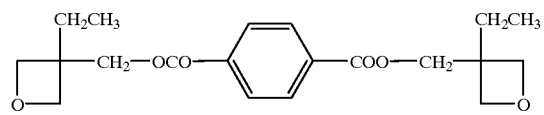

Infrared absorption spectrum: 1711 $cm^{-1}$(C=O) 1509 $cm^{-1}$(C=C aromatic) 1253 $cm^{-1}$(C—O—C ether) 985 $cm^{-1}$(C—O—C cyclic ether)

$^1$H-NMR(200 MHz, TMS, $CDCl_3$) δ(ppm): 1.44(s, 6.0H, —$CH_3$), 4.43(s, 4.0H, C—$CH_2$—O), 4.49~4.65(m, 12.2H, —$CH_2$—O—, oxetane, —$CH_2$-aromatic nucleus), 8.14(s, 4.0H, aromatic H).

REFERENCE EXAMPLE 3

21.95 g (0.088 moles) of bisphenolsulfone was charged into a three-necked flask having a capacity of 1 L, and then 150 ml of distilled water was added thereto. Then, the mixture was heated with stirring, and 56.10 g (0.351 moles) of bromine was dropwise added thereto while keeping the mixture at 90° C. The mixture was subjected to reaction at that temperature for 4 hours with stirring and then the reaction product was recovered at room temperature by filtration, washed successively with an aqueous sodium sulfite solution and distilled water, recrystallized from a solvent mixture of n-hexane-methyl ethyl ketone in a ratio by volume of 1:1 three times and dried under reduced pressure for 72 hours, whereby 33.80 g (yield: 68%) of 3,3',5,5'-tetrabromobisphenolsulfone having the following formula was obtained as white crystals having a melting point of 288.7°~289.5° C.:

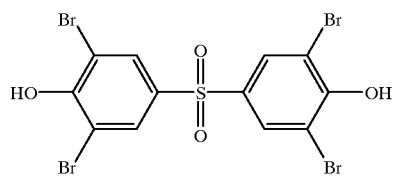

Infrared absorption spectrum: 3388 $cm^{-1}$(OH) 1116 $cm^{-1}$ (S=O) 602 $cm^{-1}$(Br)

$^1$H-NMR(200 MHz, TMS, CDCl$_3$) δ(ppm): 3.92(s, 2.1H, —OH), 8.12(s, 4.0H, aromatic H).

EXAMPLE 1

0.011 g (0.025 m moles) of tetraphenylphosphonium bromide [TPPB] and a rotor were placed into an ampoule tube in a dry bag at a humidity of 10% or less and dried at 60° C. under reduced pressure for 5 hours, and then 0.167 g (0.5 m moles) of 1,4-bis [3-(ethlyoxetanyl)methoxymethyl] benzene [BEOB], 0.183 g (0.5 m moles) of 3,3',5,5'-tetrachlorobisphenol A and 0.3 (2 mole/L) of N-methylpyrrolidone were added into the ampoule tube in the dry bag. Then, the ampoule tube was connected to a two-way cock, taken out in a tightly closed state from the dry bag and degasified in the following manner.

The ampoule tube was dipped into liquid nitrogen to freeze the interior of the reaction system, then brought into reduced pressure, dipped into water a few minutes thereafter, thereby defreezing the interior and flushed with dry nitrogen. These operations were continuously repeated twice, followed by pressure reduction again in the freezed state and sealing of the ampoule tube. After having confirmed that the sample was defreezed, the sample was heated over oil bath at 160° for 96 hours with stirring.

After completion of the reaction, the reaction mixture was diluted with chloroform and washed with distilled water three times, and the chloroform layer was poured into n-hexane to obtain precipitates, followed by recrystallization-purification of the precipitates and drying at room temperature under reduced pressure, whereby 0.347 g (yield: 99%) of yellow powdery polymers were obtained.

Number average molecular weight Mn (by GPC of dimethyl formamide eluate: polystyrene basis): 13,600

Mw/Mn: 2.33

Infrared absorption spectrum: 3458 cm$^{31}$ $^1$(OH) 1083 cm$^{-1}$(C—O—C ether)

$^1$H-NMR(200 MHz, TMS, CDCl$_3$) δ(ppm): 0.85~0.98(m, 6.0H, H$^c$), 1.58(bs, 10.3H, H$^b$), 2.66(bs, 2.0H, —OH), 3.57~3.77(m, 7.8H, H$^a$), 4.02(bs, 4.0H, H$^d$), 4.53(bs, 4.0H, H$^e$), 7.08~7.30(m, 7.7H, aromatic H).

Elemental analysis (C$_{35}$H$_{42}$O$_6$Cl$_4$):

Calculated C:60.01%, H:6.04%

Found C:59.97%, H:6.10%

EXAMPLE 2 TO 5

Example 1, the same moles of bisphenol A (0.114 g for Example 2), bisphenol AF (0.168 g for Example 3), bisphenolsulfone (0.125 g for Example 4) or 3,3',5,5'-tetrabromobispnenolsulfone obtained in Reference Example 3 (0.285 g for Example 5) was used in place of TCBPA to obtain n-hexane-insoluble polymers.

EXAMPLE 6

In Example 1, the same moles of BMOB obtained in Reference Example 1 was used in place of BEOB to obtain n-hexane-insoluble polymers.

Results of Examples 2 to 6 are given in the following Table 1.

TABLE 1

| Example No. | Yield (%) | Mn | Mw/Mn |
| --- | --- | --- | --- |
| 2 | 53 | 3000 | 1.14 |
| 3 | 55 | 3100 | 1.20 |
| 4 | 79 | 3100 | 1.20 |
| 5 | 100 | 6500 | 1.43 |
| 6 | 99 | 14400 | 2.83 |

EXAMPLE 7

In Example 1, the same moles of other catalyst was used in place of the TPPB catalyst to obtain n-hexane-insoluble polymers. In the case of using a combination of CF$_3$SO$_3$H/(C$_6$H$_5$)$_4$PBr, equal moles of the component catalysts were used respectively. The results are shown in the following Table 2.

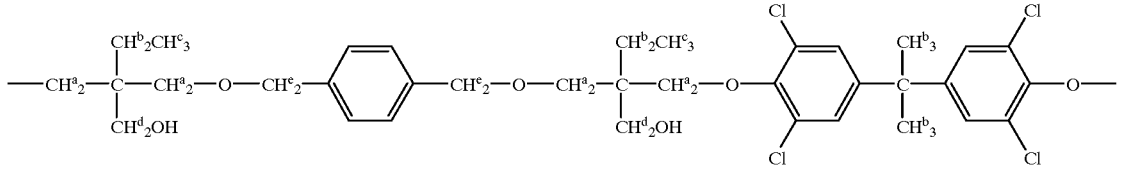

$^{13}$C-NMR(200 MHz, TMS, CDCl$_3$) δ(ppm): 7.63(C$^c$), 22.77(C$^b$), 30.26(C$^f$), 42.39(C$^e$), 43.42(C$^d$), 66.23(C$^a$), 73.35(C$^g$), 127.27, 127.58, 129.04, 137.58, 146.77, 148.99 (aromatic C).

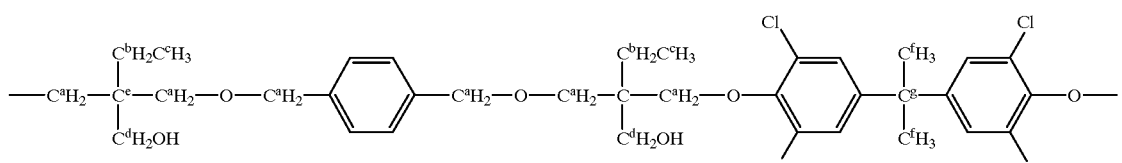

TABLE 2

| Catalyst | Yield (%) | Mn | Mw/Mn |
|---|---|---|---|
| None | 51 | 3200 | 1.11 |
| p-toluenesulfonic acid | 56 | 5400 | 1.26 |
| $CF_3SO_3H/(C_6H_5)_4PBr$ | 60 | 4900 | 1.26 |
| 18-Crown ether-6.KCl | 97 | 6300 | 1.19 |
| 18-Crown ether-6.KBr | 100 | 9200 | 1.76 |
| 18-Crown ether-6.KI | 97 | 9300 | 1.45 |
| Dibenzo 18-Crown ether-6.CsF | 100 | 5300 | 1.19 |
| Dibenzo 18-Crown ether-6.CsCl | 97 | 5100 | 1.18 |
| Dibenzo 18-Crown ether-6.CsBr | 100 | 5600 | 1.22 |
| $(C_4H_9)_4NCl$ | 75 | 2400 | 1.18 |
| $(C_4H_9)_4NBr$ | 71 | 2500 | 1.24 |
| $(C_4H_9)_4NI$ | 76 | 2500 | 1.20 |
| $(C_4H_9)_4PCl$ | 87 | 2700 | 1.78 |
| $(C_4H_9)_4PBr$ | 87 | 3500 | 1.61 |
| $(C_6H_5)_4PCl$ | 78 | 4000 | 1.16 |
| $(C_6H_5)_4PI$ | 99 | 9000 | 1.48 |

EXAMPLE 8

In Example 1, the same amount of other solvent was used in place of N-methylpyrrolidone to obtain n-hexane-insoluble polymers. The results are shown in the following Table 3.

TABLE 3

| Solvent | Yield (%) | Mn | Mw/Mn |
|---|---|---|---|
| None | 100 | 11700 | 2.19 |
| o-dichlrorobenzene | 99 | 6600 | 1.20 |
| Sulfolane | 98 | 10000 | 1.82 |
| Dimethyl acetamide | 100 | 15200 | 1.85 |
| Dimethyl formamide | 100 | 8400 | 1.23 |

The solubility of the polymers obtained in Example 1, Example 5 and Example 6 are show in the following Table 4.

TABLE 4

| Solvent | Polymer Ex. 1 | Ex. 5 | Ex. 6 |
|---|---|---|---|
| n-Hexane | − | − | − |
| Methanol | − | − | − |
| Acetone | ++ | ++ | ++ |
| Acetonitrile | − | − | − |
| Ethyl acetate | ++ | − | ++ |
| Dioxane | ++ | ++ | ++ |
| Tetrahydrofuran | ++ | ++ | ++ |
| Toluene | ++ | − | ++ |
| Chlorobenzene | ++ | − | ++ |
| Dimethylformamide | ++ | ++ | ++ |
| Dimetylacetamide | ++ | ++ | ++ |
| Dimetylsulfoxide | ++ | ++ | ++ |

(Remarks)
++: soluble at room temperature
+: soluble by heating
+−: partly soluble or swelling
−: insoluble

What is claimed is:

1. A polyaddition copolymer having repetition units represented by the following general formula:

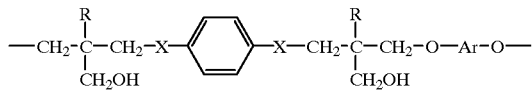

where R is a lower alkyl group, Ar is a bisphenol compound residue and X is a $CH_2O$ group or a $COO$ group.

2. A process for producing a polyaddition compound having repetition units represented by the following general formula:

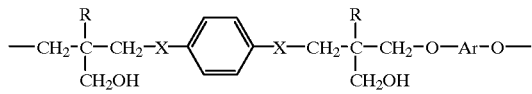

where R is a lower alkyl group, Ar is a bisphenol compound residue and X is a $CH_2O$ group or a $COO$ group, which comprises subjecting a bisoxetane compound represented by the following general formula:

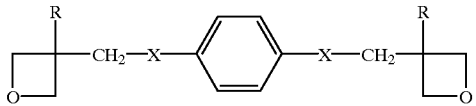

where R and X have the same meanings as defined above, to copolymerization reaction with a bisphenol compound HO—Ar—OH, where Ar has the same meaning as defined above.

3. A process according to claim 2, wherein the copolymerization reaction is carried out without any catalyst.

4. A process according to claim 2, wherein the copolymerization reaction is carried out in the presence of a catalyst selected from a quaternary onium salt, Crown ether complex and an organic sulfonic acid.

5. A process according to claim 4, wherein the catalyst is used in an amount of about 1 to about 20% by mole on the basis of the bisoxetane compound.

6. A process according to claim 2, wherein the copolymerization reaction is carried out in an organic solvent.

7. A process according to claim 6, wherein the organic solvent is an aromatic hydrocarbon, a halogenated hydrocarbon, an alkoxyarmatic hydrocarbon or an aprotic polar solvent.

8. A process according to claim 2, wherein the copolymerization reaction is carried out without any solvent.

* * * * *